US009658896B2

(12) United States Patent
Chiu et al.

(10) Patent No.: US 9,658,896 B2
(45) Date of Patent: May 23, 2017

(54) APPARATUS AND METHOD TO MANAGE DEVICE PERFORMANCE IN A STORAGE SYSTEM

(75) Inventors: Lawrence Y. Chiu, Saratoga, CA (US); Chao Guang Li, Shanghai (CN); Yang Liu, Shanghai (CN); Paul H. Muench, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/473,485

(22) Filed: May 16, 2012

(65) Prior Publication Data
US 2013/0312005 A1 Nov. 21, 2013

(51) Int. Cl.
*G06F 9/50* (2006.01)
*G06F 3/06* (2006.01)

(52) U.S. Cl.
CPC ............ *G06F 9/5088* (2013.01); *G06F 3/061* (2013.01); *G06F 3/0647* (2013.01); *G06F 3/0653* (2013.01); *G06F 3/0685* (2013.01); *G06F 2209/5022* (2013.01)

(58) Field of Classification Search
CPC ...... G06F 9/5088; G06F 3/061; G06F 3/0647; G06F 3/0685; G06F 3/0653; G06F 2209/5022
See application file for complete search history.

(56) References Cited

U.S. PATENT DOCUMENTS

| 6,978,259 B1* | 12/2005 | Anderson et al. ............... 706/19 |
| 7,184,933 B2* | 2/2007 | Prekeges et al. ............. 702/186 |
| 8,239,584 B1* | 8/2012 | Rabe et al. ....................... 710/8 |
| 8,429,351 B1* | 4/2013 | Yu et al. ........................ 711/132 |
| 8,433,848 B1* | 4/2013 | Naamad et al. ............... 711/114 |
| 8,473,459 B2* | 6/2013 | Chiu et al. ..................... 707/637 |
| 2004/0098359 A1* | 5/2004 | Bayliss et al. ..................... 707/1 |
| 2005/0097271 A1* | 5/2005 | Davies .................. G06F 3/0607 711/114 |
| 2011/0010514 A1* | 1/2011 | Benhase et al. ............... 711/162 |
| 2012/0303929 A1* | 11/2012 | Chiu et al. .................... 711/173 |

OTHER PUBLICATIONS

Mengzhi Wang et al. "Storage Device Performance Prediction with CART Models," Oct. 5-7, 2004, 12th Annual Meeting of the IEEE/ACM International Symposium.*

(Continued)

*Primary Examiner* — Yaima Rigol
*Assistant Examiner* — Tasnima Matin
(74) *Attorney, Agent, or Firm* — Yakov Sidorin; Quarles & Brady LLP

(57) ABSTRACT

A method to optimize workload across a plurality of storage devices of a storage system, where the method monitors a workload of a first storage device belonging to a first tier of the storage system, calculates a performance of the workload of the first storage device belonging to a first tier of the storage system, interpolates a performance threshold for the first storage device using the workload pattern of the first storage device and a profile of the first storage device, the profile identifying a benchmark performance of the first storage device, and optimizes a usage of the first storage device within the storage system to improve a performance of the first storage device.

17 Claims, 5 Drawing Sheets

(56) References Cited

OTHER PUBLICATIONS

Yin et.al. "An Empirical Exploration of Black-Box Performance Models for Storage Systems" IEEE, 2006.*
Eric Anderson et.al. "Selecting RAID levels for disk arrays" FAST Jan. 2002.*
Yin. et.al. "Automatic Action Advisor for Storage System Performance Management" Nov. 28, 2006, section 3, 4, Figure 4.7.*

* cited by examiner

APPARATUS AND METHOD TO MANAGE DEVICE PERFORMANCE IN A STORAGE SYSTEM

FIELD OF THE INVENTION

The invention relates to an apparatus and method to manage storage device performance in a storage system. In certain embodiments, the invention is directed to optimizing device performance in a multi-tier storage system.

BACKGROUND OF THE INVENTION

Data storage systems are used to store large amounts of information received from one or more sources. A data storage system often comprises a storage controller in communication with one or more clients, often referred to as "hosts," and also in communication with a plurality of data storage devices. A host computing device may send a storage controller a write command to write certain information to a data storage medium, and/or a read command to read information from a data storage medium, and/or a copy command to copy information from one data storage medium to another data storage medium. Host computers may also provide commands to a storage controller to establish or revise physical and/or logical configurations. In certain embodiments, a read command, or a write command, or a copy command, or a configuration command comprises a plurality of objects packaged in one command In a multi-tier storage system a single storage system may include a number of different tiers, each containing storage devices having different performance characteristics. A higher performance tier of a particular storage system may include a number of solid state disks (SSDs) that provide short seek times. Because SSDs can be relatively expensive, the storage system may also include a lower performance tier made up of a number of slower devices, such as Serial Advanced Technology Attachment (SATA) drives. Although the SATA drives provide lower seek times, they can be a more inexpensive way to store data than additional SSD drives.

Because the higher performance tier may provide faster seek times, it may seem preferable to configure the storage system so that the higher performance tier is fully loaded to ensure that the high-performance tier is fully utilized. Unfortunately, although the storage devices in the higher performance tier have better performance in normal conditions, the performance of those storage devices is severely degraded when the devices are overloaded. In fact, when overloaded, the performance of those devices may be worse than that of the storage devices populating the lower performance tiers. As such, it can be difficult for a storage system to move an appropriate workload to the high performance devices of high performance tiers to ensure optimized performance of the storage system.

SUMMARY OF THE INVENTION

A method to optimize workload across a plurality of storage devices of a storage system is presented. The method monitors a runtime workload of a first storage device belonging to a first tier of the storage system, and calculates throughput and bandwidth threshold for the first storage device belonging to a first tier of the storage system to optimize usage of the storage device and improve performance. The method then interpolates an optimized workload for the first storage device using the runtime workload of the first storage device and a profile of the first storage device. The profile identifies a benchmark performance of the first storage device. The method optimizes a usage of the first storage device within the storage system to improve a performance of the first storage device.

An article of manufacture is presented, where that article of manufacture comprises a non-transitory computer readable medium comprising computer readable program code disposed therein to perform optimizing workload across a plurality of storage devices of a storage system, wherein the article of manufacture is in communication with a storage controller. The computer readable program code comprising a series of computer readable program steps to effect monitoring a runtime workload of a first storage device belonging to a first tier of the storage system, and calculating throughput and bandwidth threshold for the first storage device belonging to a first tier of the storage system to optimize usage of the storage device and improve performance. The method then interpolates an optimized workload for the first storage device using the runtime workload of the first storage device and a profile of the first storage device. The profile identifies a benchmark performance of the first storage device. The method optimizes a usage of the first storage device within the storage system to improve a performance of the first storage device.

A computer program product is presented, where the computer program product is encoded in a non-transitory computer readable medium and useable with a programmable computer processor to optimize workload across a plurality of storage devices of a storage system. The computer program product comprises computer readable program code which causes said programmable computer processor to monitor a runtime workload of a first storage device belonging to a first tier of the storage system, and calculate throughput and bandwidth threshold for the first storage device belonging to a first tier of the storage system to optimize usage of the storage device and improve performance. The method then interpolates an optimized workload for the first storage device using the runtime workload of the first storage device and a profile of the first storage device. The profile identifies a benchmark performance of the first storage device. The method optimizes a usage of the first storage device within the storage system to improve a performance of the first storage device.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 4:
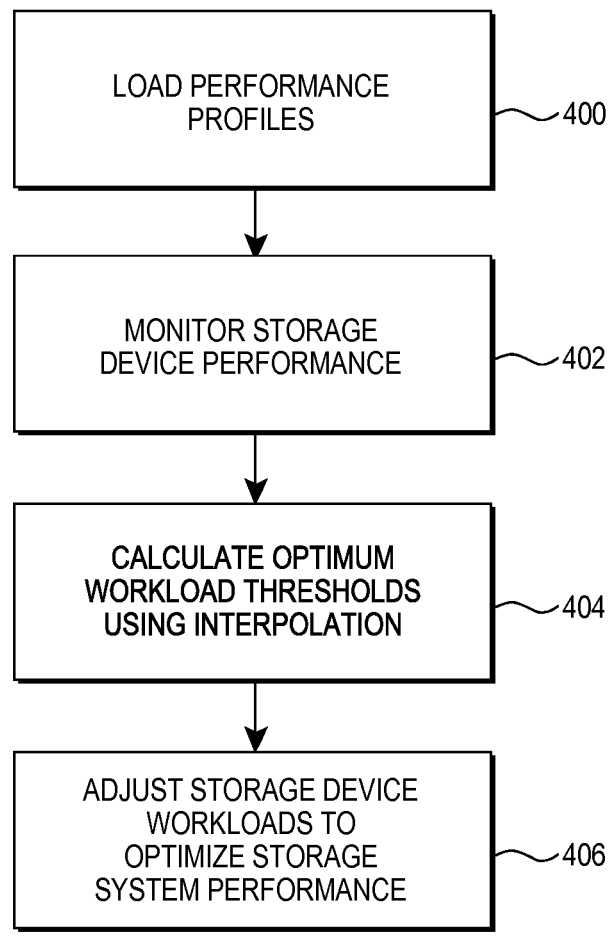
FIG. 4 is a flow chart summarizing certain steps in Applicants' method.

The schematic flow chart diagram included are generally set forth as logical flow-chart diagrams (e.g., FIG. 4). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIG. 4). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
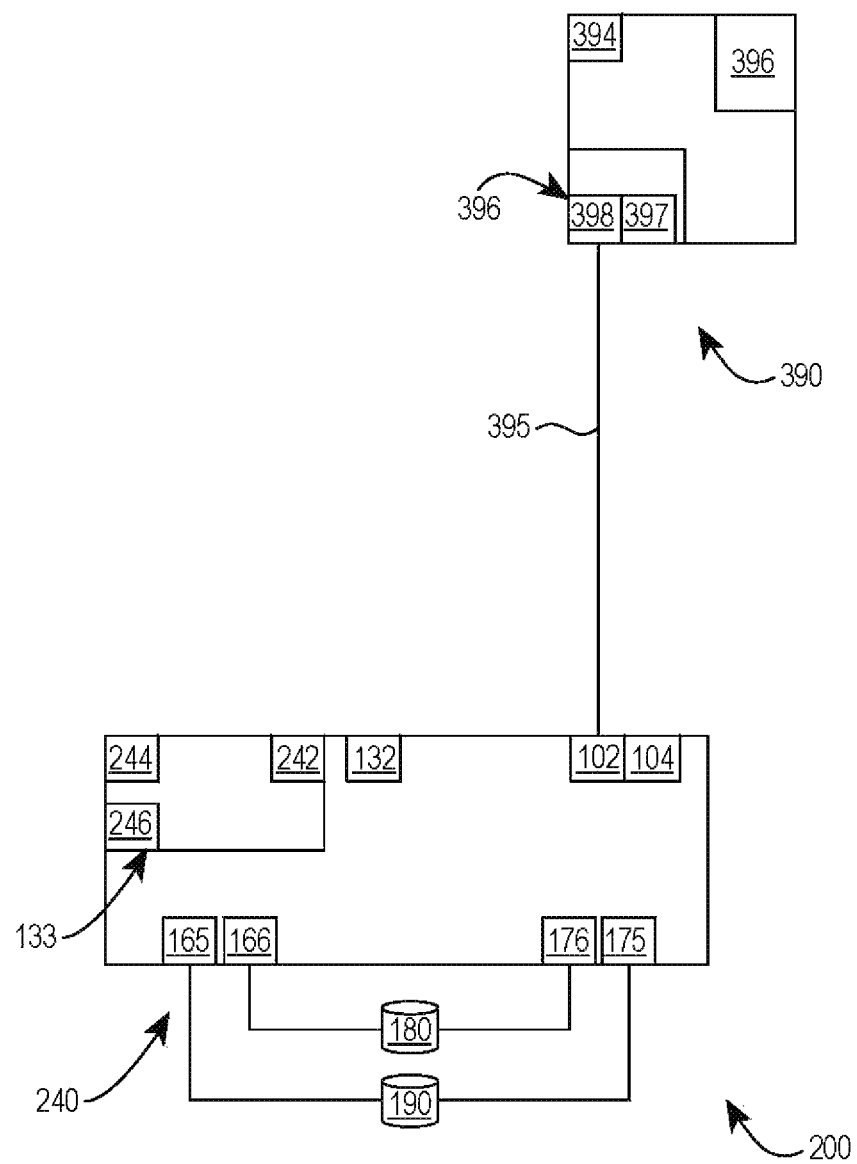
FIG. 2 is a block diagram showing a host computer in communication with a storage controller.

Referring to FIG. 2, data storage system 200 includes storage controller 240 which interconnects a plurality of data storage drives 180 and/or a plurality of data storage drives 190, with a computing device 390. Storage controller 240 comprises a processor 132 and computer readable memory 133, instructions 242 written to computer readable memory 133, a plurality of supported, i.e. enabled, commands 244 written to computer readable memory 133, and a plurality of supported, i.e. enabled, command parameters 246 written to computer readable memory.

In certain embodiments, storage controller 240 communicates with the plurality of data storage devices 180 via device adapters 166 and 176, and with plurality of data storage devices 190 via device adapters 165 and 175, using an I/O protocol such as SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, or SATA (Serial ATA).

In the illustrated embodiments of FIG. 2, computing device 390 comprises a processor 394 and computer readable medium 396, wherein instructions 398 are encoded in computer readable medium 396. In the illustrated embodiments of FIG. 2, computing device 390 further comprises application 397. In certain embodiments, application 397 comprises a storage management program to manage the transfer of data to and from a data storage controller. In certain embodiments, that storage management program may include the functionality of the IBM DFSMS implemented in the IBM MVS operating system.

In certain embodiments, computing device 390 comprises a host computer, wherein that host computer generates data, and provides that data to storage controller 240. Storage controller 240 writes that data to one or more of a plurality of data storage devices 180 and/or 190. Further in the illustrated embodiment of FIG. 2, storage controller 240 is in communication with one host computer 390. In other embodiments, storage controller 240 is in communication with a plurality of host computers. As a general matter, hosts computers 390 includes a computing device, such as a mainframe, personal computer, workstation, and combinations thereof, including an operating system such as Windows, AIX, Unix, MVS, LINUX, etc.

Figure 3:
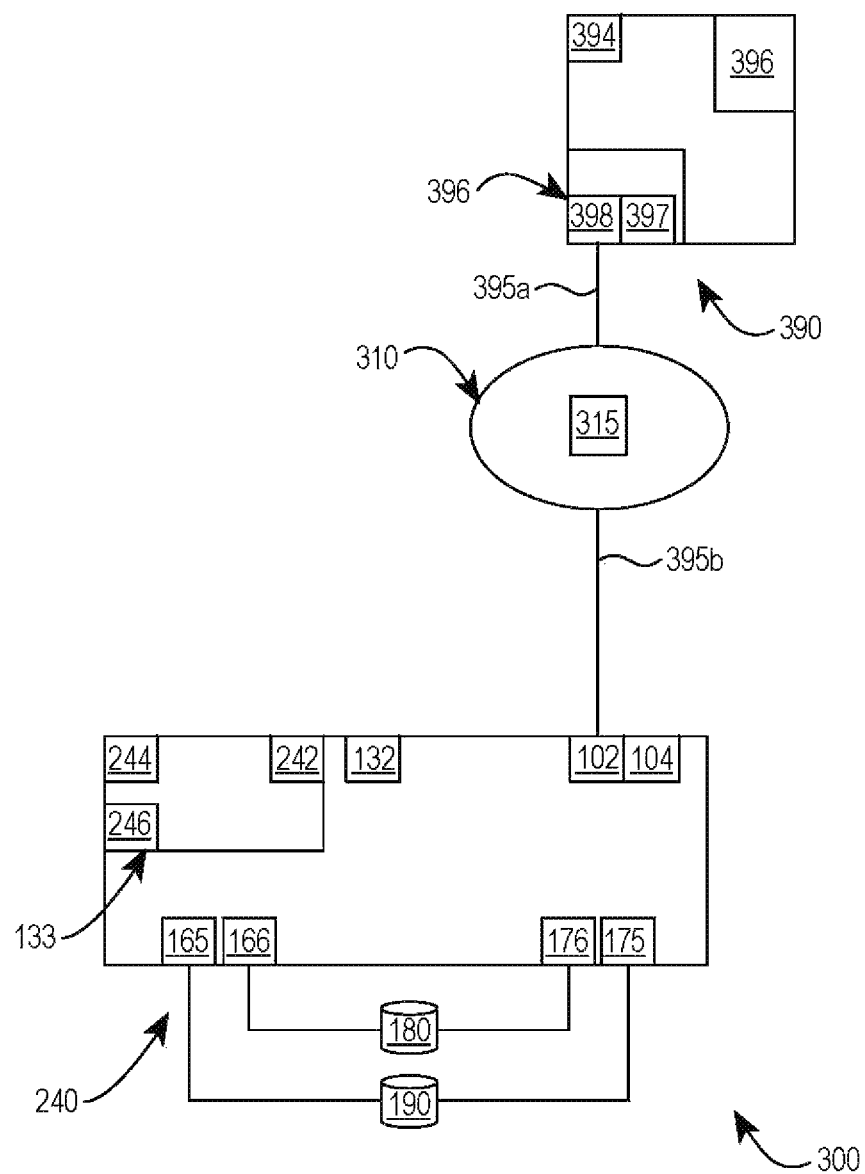
FIG. 3 is a block diagram showing a host computer and a storage controller communicating with one another via a fabric.

FIG. 3 shows data storage system 300 wherein the host computer and storage controller of FIG. 2 where host computer 390 and storage controller 240 communicate with one another via fabric 310. In certain embodiments, fabric 310 includes, for example, one or more Fibre Channel ("FC") switches 315. In certain embodiments, those one or more switches 315 include one or more conventional router switches. In the illustrated embodiment of FIG. 3, one or more switches 315 interconnect host computer 390 to storage controller 240 via communication paths 395a and 395b using any type of I/O interface, for example, FC, Infiniband, Gigabit Ethernet, Ethernet, TCP/IP, iSCSI, SCSI I/O interface, or one or more signal lines used by FC switch 315 to transfer information through, to, and from storage controller 240, and subsequently the plurality of data storage devices 180 and/or 190.

In the illustrated embodiments of FIGS. 2 and 3, host computer 390 is interconnected to host adapter 102 disposed in storage controller 240 via communication link 395. The illustrated embodiment of FIG. 2 shows host computer 390 interconnected with storage controller 240 via one communication link. The illustrated embodiment of FIG. 3 shows host computer 390 interconnected with fabric 310 via one communication link. In other embodiments, host computer 390 is interconnected with storage controller 240/fabric 310 with more than one communication link. In certain embodiments, communication link 395 may be configured to comprise up to 256 logical communication paths.

Figure 1:
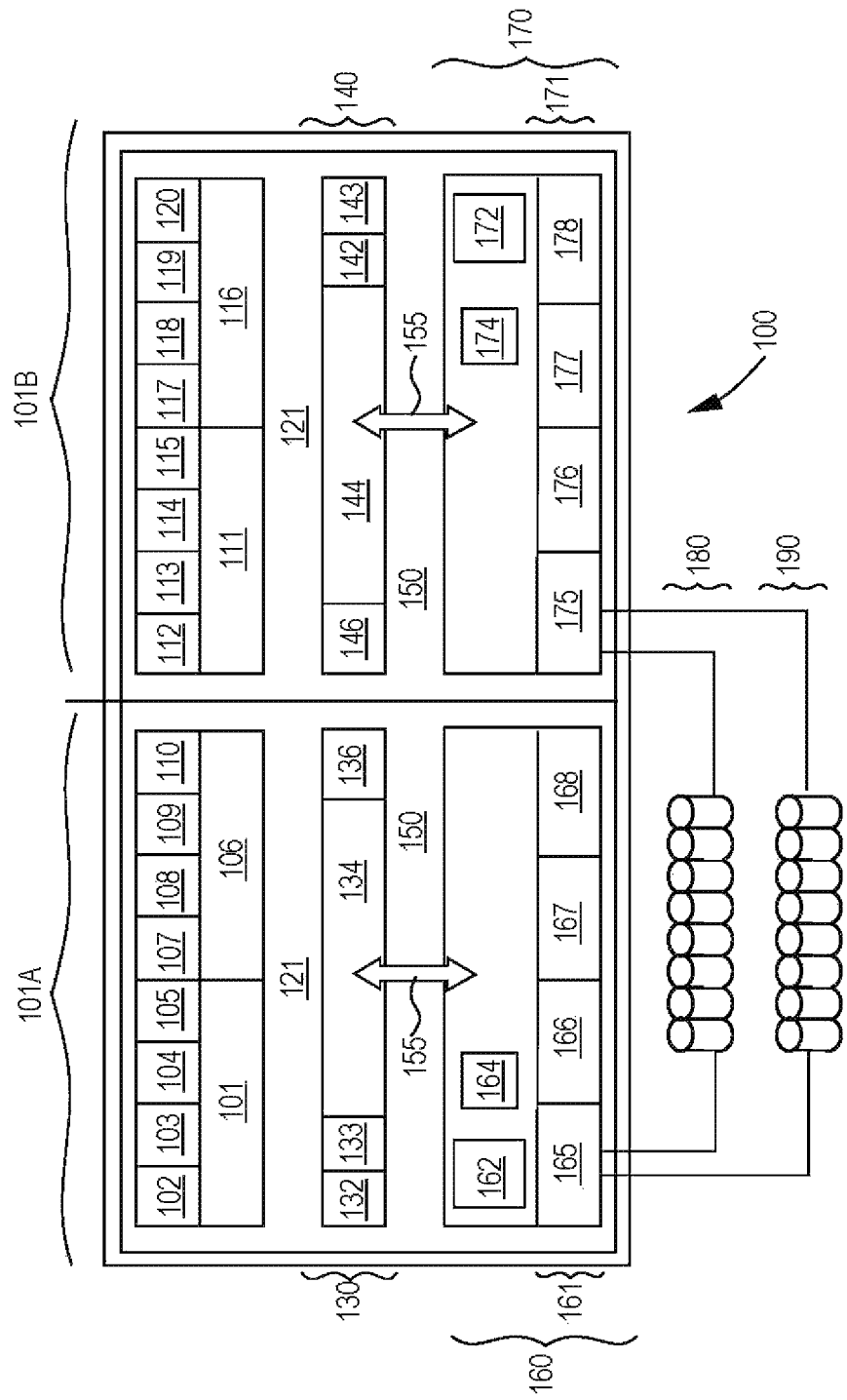
FIG. 1 is a block diagram showing one embodiment of Applicants' storage controller.

Referring now to FIG. 1, in certain embodiments, storage controller 240 comprises a data storage library, such as for example and without limitation, data storage library 100. In certain implementations, data storage library 100 includes a first cluster 101A and a second cluster 101B, wherein clusters 101A and 101B are disposed in the same housing. In the illustrated implementation of FIG. 1, data storage library 100 includes a plurality of host adapters 102-105, 107-110, 112-115, and 117-120, disposed in four host bays 101, 106, 111, and 116. In other implementations, data storage system includes fewer than 16 host adapters. Regardless of the number of host adapters disposed in any implementations of the system, each of those host adapters includes a shared resource that have equal access to both central processing/cache elements 130 and 140.

Each host adapter may comprise any kind of I/O interface. Each host adapter is connected to both clusters 101A and 101B through interconnect bus 121 such that each cluster can handle I/O from any host adapter, and such that the storage controller portion of either cluster can monitor the communication path error rate for every communication path, physical and/or logical, interconnected with data storage library 100.

Storage controller portion 130 includes processor 132, computer readable medium 133, cache 134, and nonvolatile storage ("NVS") 136. In certain implementations, computer readable medium 133 includes random access memory. In certain implementations, computer readable medium 133 includes non-volatile memory.

Storage controller portion 140 includes processor 142, computer readable medium 143, cache 144, and NVS 146. In certain embodiments, computer readable medium 143 includes random access memory. In certain embodiments, computer readable medium includes non-volatile memory.

I/O portion 160 includes a plurality of device adapters, such as device adapters 165, 166, 167, and 168. I/O portion 170 further includes a plurality of device adapters, such as device adapters 175, 176, 177, and 178.

In certain embodiments of the system, one or more host adapters, storage controller portion 130, and one or more device adapters, are packaged together on a single card disposed in the data storage system. Similarly, in certain embodiments, one or more host adapters, storage controller portion 140, and one or more device adapters, are disposed on another card disposed in the data storage system. In these embodiments, system 100 includes two cards interconnected with a plurality of data storage devices.

In the illustrated embodiment of FIG. 1, sixteen data storage devices are organized into two arrays. In other embodiments, the data storage system includes more than two storage device arrays. In certain embodiments, each storage array appears to a host computer as one or more logical devices.

In certain embodiments, arrays 180 and/or 190 utilize a RAID (Redundant Array of Independent Disks) protocol. In certain embodiments, arrays 180 and/or 190 include what is sometimes called a JBOD array, i.e. "Just a Bunch Of Disks" where the array is not configured according to RAID. As those skilled in the art will appreciate, a RAID rank includes independent disk drives configured in an array of disk drives to obtain performance, capacity and/or reliability that exceeds that of a single large drive.

Arrays 180 and/or 190 (and any other attached arrays of storage devices) may include different tiers within the data storage system. Depending upon the particular storage devices incorporated into an array and their particular configuration, the different tiers of a data storage system can provide varying performance characteristics. One tier, for example, may be a high-performance tier providing fast seek times and large bandwidth, but only limited storage capacity. A second tier may provide lower performance, due to its use of slower and cheaper storage devices, but increased storage capacity.

In one typical storage system implementation, a first high-performance tier may include an array of SSDs. SSDs are relatively high performance storage devices providing high performance for random input/output operations. Due to their expense, though, the first tier may not provide a large storage capacity. To compensate, the storage system may include a second lower performance tier including an array of SATA drives that, while slower than SSDs, provide a larger and more cost-effective storage capacity. Finally, some storage systems may include a third tier comprising an array of tape drive devices that provide substantial storage capacity, but relatively slow performance.

Because each tier of the storage system provides different performance characteristics (the first tier may be optimized for small random input/output operation, while other tiers may be optimized for large file transfers and high bandwidth), it is important to ensure that the data stored by the storage system is distributed appropriately across the different tiers to allow for efficient operation of the system. The appropriate distribution of data may be different depending upon how the storage system is actually used in a particular implementation.

In certain embodiments, to optimize the distribution of data across tiers, Applicants' apparatus and method moves hot data (i.e., data that is regularly accessed) to a higher performance tier (e.g. comprising a number of SSD storage drives) to improve performance, and moves cold data (i.e., data that is not regularly accessed) to a lower performance tier (e.g., comprising a number of SATA storage devices) to improve economy. Although the storage devices in the higher performance tier have better performance for random input/output operations, the devices' performance will be degraded significantly when overloaded, possibly becoming worse than the performance of storage devices in lower performance tiers. As a result, if too much hot data is moved to the high-performance tier, the performance of the entire storage system may be severely degraded.

Applicants' apparatus and method may also be used to optimize workload distributions within homogenous storage systems that include a single tier of similar storage devices. In general, the system and method described herein may be utilized to optimize workload in a number of different storage systems, including those having a homogeneous pool of storage devices, 2 tier pool of storage devices, 3 tier pool of storage devices, or other combinations of storage devices.

For example, within a storage system, some devices (e.g., SSDs) are optimized for high performance, random input/output, while different devices (e.g., tapes or ENT drives) are optimized for high bandwidth activities like backup or logging operations. If random input/output operations are implemented on devices designed for backup or logging operations performance may be reduced. Similarly, a mixture of large sequential input/output operations and small block random input/output operations on the same storage device can severely degrade the device's performance.

The actual performance of a particular storage device is affected by a number of factors including characteristics of the device itself, characteristics of the workload assigned to the storage device, and variations in the storage system including the storage system's configuration and platform (see Table 1 below). Additionally, within a particular tier, the configuration of a number of different storage devices can affect performance. For example, in a particular tier, a number of SATA devices can have different RAID configurations resulting in different performance. As a result, it is difficult for a storage system to move workload to high performance device to better utilize the device in those tiers, while at the same time prevent moving too much workload to the high performance tier hurting overall performance of the storage system.

TABLE 1

| Storage Device Characteristics | Workload Characteristics | Storage System Platform Variations |
|---|---|---|
| SLC V.S MLC SSD drives | Read Write Ratio | Higher performance platform/Lower performance platform (DS8300 V.S DS8800) |
| RPM (10K/15K) fro ENT and SATA drives | Average I/O size | Different platform (DS8700 VS SVC) |
| Raid type (Raid 5/Raid 10/Raid 6) | Random V.S Sequential | |

Furthermore, the device performance variations listed in Table 1 may also cause variations in a device's performance capability within a particular tier. So even though capacity can be stripped evenly among all the storage devices with a tier, the device performance utilization may be different, thus the overall performance may be impacted by the devices having higher performance utilization.

Applicants' apparatus and method, therefore, provides a storage system including a micro tier system configured to manage the performance (and variability of performance) of a number of storage devices in different tiers of a storage system. The micro tier is then configured to optimize the distribution of data amongst devices within tiers of a storage system, as well as across devices occupying different tiers. The micro tier system can, in a multi-tier environment, predict how much data can be moved to an upper tier without breaking the tier's performance capability (i.e., exceeding device performance capability will cause performance degrade dramatically). Within a tier in a multiple-tier environment or in a single-tier environment, the micro tier system can guide workload redistribution to different storage devices to maximize the performance utilization of all devices that may have different performance capabilities. The micro tier can also predict a future performance overload and pre-actively move workload off a storage device to avoid that overload (e.g., using trend damping combined with instantaneous overload detection to avoid thrashing on moving extents between tiers and within a tier).

In order to optimize the performance of a particular storage system, the storage devices residing in the different tiers of the storage system are first tested for performance under different platforms and with various workload conditions. The testing may take place offsite, before the storage system is put into operation. The tested or benchmark performance characteristics of each storage device in the various tiers of the storage system are saved into a profile that is made available to the micro tier system. Such performance characteristics include, without limitation, average seek times for read operations and average write times using a standardized file. In general, the profiles store, for each storage device, the throughput and bandwidth thresholds of the device under a limited number of given workloads.

Once the storage system is put into use, those stored performance profiles are compared with actual storage device runtime performance. The micro tier system can then optimize the distribution of data across the various tiers and amongst the storage devices to optimize the storage system. In one implementation, the performance profiles for each storage device include the results of tests directed to each storage device's read/write ratio, average input/output size, and random sequential ratio.

During operation of the storage system, the micro tier system identifies the physical characteristics of the connected storage devices as well as configuration information, and monitors the actual workload characteristics of each storage device. The micro tier system then uses mapping or interpolation algorithms, to determine the runtime performance capabilities of each storage device. The runtime performance capabilities are then compared to the actual performance of each storage device, to guide the micro tier to perform both short term and long-term performance planning to migrate workload between various tiers to balance resource use and improve storage system performance.

By monitoring the runtime workload (and determining the corresponding throughput and bandwidth thresholds for that workload) of various storage devices, therefore, the micro tier system can identify overloaded storage device within a particular tier. Once an overloaded device is identified, the micro tier system can perform a recovery action, for example by transferring workload away from the overloaded device or devices. Based on the runtime device performance capability, the micro tier system can also check whether the utilization of storage devices within a tier is balanced. If not, the micro tier system can move workload between storage devices to balance device performance. As such, the present system provides a feedback mechanism to allow the workload of the storage devices or a storage system to be monitored and continuously optimized. If separate runtime device utilization can be obtained from the device itself (e.g., DS8000 rank utilization), the micro tier system can self-adjust the internal algorithm to guide migrating workload based on the given utilization.

In certain embodiments, Applicants' micro tier system is implemented as software running on a processor of a storage controller (e.g., storage controller 240 of FIG. 2). For example, in certain embodiments the micro tier comprises computer readable program code, i.e. a number of instructions, stored in a non-transitory computer readable memory 133 and implemented by processor 132 of controller 240. In certain embodiments, Applicants' micro tier system operates in conjunction with a conventional tier system to allocate workloads to different tiers within a storage system, or different storage devices within a tier. The profiles that are used by the micro tier to distribute load and job responsibilities between storage devices can be stored in any suitable computer readable memory, such as computer readable memory 133 of storage controller 240, shown in FIG. 2.

In certain embodiments, Applicants' micro tier system uses the profiles of connected storage device in combination with actual use characteristics to optimize a configuration and performance of the storage devices. Each storage device in a particular storage system is tested before installation to determine a performance profile for the storage device.

To create a benchmark performance profile for a particular storage device, a number of operational characteristics of the device may be tested in a well-defined environment. For example, a profile may record a particular storage device's performance under a number of known read and/or write operations. Example operations include 100% write performance, 100% read performance, 50% write performance, 50% read performance and random or sequential write and read performance. These tests may be performed in a number of different environments. For example, the performance of storage devices suitable for inclusion in a RAID array could be tested in a number of different RAID configurations. In addition to storing information describing the performance of particular storage devices in different configurations, the profiles may describe the performance of a storage device as used within different platforms.

The performance profile of a particular storage device can be affected by many factors. Some of the factors are unchanging or static. Such static factors include storage device revolutions per minute (RPM) for devices including spinning disks, RAID configuration, vendor, platform, and the like. Some of the factors may be dynamic and vary based upon operating conditions of the storage device. Dynamic factors include workload read/write ratio, average input/output size, random/sequential ratio, etc. The static factors are determined and stored in a profile within a pre-measured matrix of rank performance capability for a particular set of read/write ratio and input/output size combinations. In contrast, the dynamic factors can be calculated dynamically with customer run-time workload statistics.

The static performance factors represent performance of the storage device in an environment that is well known. Using the profile, the micro tier can then analyze the actual performance and runtime environment of the storage device within the storage system to the performance information contained in the profile. If the storage device is not being used in a way that allow the storage device to operate in its most efficient capacity, the micro tier can adjust the load distribution within the storage system to make the utilization of the storage device more efficient.

In many implementations, a particular storage system will ship with a profile database including information describing the performance of the storage devices included in the several tiers of the storage system. As new storage devices are incorporated into the storage system, additional profiles may be added for each new storage device. Similarly, the profiles can be updated over time as new profiles become available due to updates in the storage devices (e.g., firmware upgrades, or new performance metrics).

During operation of the storage system, the micro tier system accesses the stored profile for each attached storage device to determine the static performance factors of each storage device. The micro tier system also monitors the current or runtime workload of each connected storage device. The micro tier system then analyzes the runtime workload (e.g., by calculating throughput and bandwidth thresholds for the active workload of each storage device) and compares the current workload conditions for each storage device to the static performance capabilities stored within the device's profile. In some cases, however, the runtime workload characteristics will not match the workload characteristics stored in the device's profile (as the profile only stores data for a limited number of workloads). As such, the micro tier system will sometimes perform interpolation to translate the thresholds stored in the device's profile into thresholds for the current runtime workload. The interpolation may include a linear interpolation method, Harmonic interpolation method, or combinations thereof. Based upon the comparison, the micro tier system guides the storage system in performing both short-term and long-term performance planning to optimize the usage (and, thereby, performance) of storage devices connected to the storage system. The optimization may include migrating workload between upper and lower tiers to balance resource usage and improve device performance utilization. Additionally, the optimization may call for adjusting workload between storage devices within a single tier.

Additionally, by monitoring the storage system's runtime workload, the micro tier system can determine whether any storage device in the storage system is overloaded. If so, the micro tier system can initiate a recovery action that may involve moving workload away from the overloaded devices. This recovery action can be initiated automatically so that the storage device's overloaded condition is remedied soon after the condition is detected.

Based on the runtime device performance capability, the micro tier system can also analyze the performance of storage devices within a single tier to identify whether their performance utilization is balanced. If not, the micro tier system can move workload between storage devices in the tier to balance storage device performance utilization.

Accordingly, the present micro tier system can perform three activities to improve performance of a storage system. First, the micro tier system can guide a storage system's tiering software to migrate workload to achieve performance improvements without affecting both long term and short term device performance. For example, the micro tier system can assist tiering software such as Easytier to move data between tiers to improve performance. For example, data associated with higher rates of input/output activity may be moved to an SSD tier while guarding against poor SSD tier bandwidth performance by preventing the SSD from becoming overloaded (in which case SSD performance is not significantly better than that of an ENT tier).

Second, the micro tier system can detect an overloaded storage device and pro-actively remedy the problem. For example, by measuring a storage device's short-term performance run-time data, the micro tier system can detect sudden customer workload change, possibly resulting in overloading of a particular storage device. If an overload condition is detected, the micro tier system guides the storage system's tiering software to move workload away from the overloaded device. The micro tier system may also specific a particular type of workload (e.g., Random, Sequential, or high bandwidth input/output workloads) to move away from the overloaded storage device.

Third, the micro tier system can detect a performance utilization imbalance within a particular tier and then guide an automatic re-balance of workload within the tier. The micro tier system can analyze the workload and performance of each storage device within a tier based upon a number of factors (e.g., RPM, vendor, RAID type, platform, read/write ratio, input/output size, random/sequential ratio). Based on that analysis, the micro tier system can guide a storage system's tiering software to perform within-tier optimization by moving workload from the higher utilized storage devices within a tier to lower utilized devices within the same tier.

FIG. 4 is a flowchart illustrating an example method for a micro tier system to manage storage device performance within a storage system. In certain embodiments, the steps illustrated in FIG. 4 are performed by a storage controller, such as storage controller 240. In certain embodiments, the steps illustrated in FIG. 4 are performed by a processor disposed in a storage controller, such as controller 132 and/or controller 142. In certain embodiments, the steps illustrated in FIG. 4 are performed by a host computer, such as host computer 390. In certain embodiments, the steps illustrated in FIG. 4 are performed by a storage management application encoded in a host computer, such as application 397.

In step 400 the micro tier system loads the performance profiles for one or more connected storage devices contained within one or more tiers. As discussed above, the profiles identify a number of performance characteristics (e.g., throughput and bandwidth thresholds under a limited number of workload conditions) of the storage device that may be incorporated into the storage system. Step 400 may be implemented at the storage system start-up time. Alternatively, the profiles may be loaded at any time following power-up of the storage system. Additionally, the profiles may be reloaded any number of times to ensure that the micro tier system is using a most up-to-date copy of the profiles.

After loading the profiles, the micro tier system continuously monitors the real time workload of the one or more storage devices in step 402. The real time workload can then be compared to the performance characteristics stored in the device's profile to determine whether the devices are operating efficiently.

In step 404, therefore, the micro tier system analyzes the stored profiles to determine the optimum workload thresholds for the devices given the ongoing real time performance of the storage system. Because the profiles only store performance characteristics for the storage devices operating at discrete load levels or workloads, the micro tier system interpolates the profile data in order to identify the optimum workload thresholds for the storage devices operating within the storage system. Interpolation allows the micro tier to map the performance data for the discrete workload values in the device's profile to the actual workload identified to in step 402. This interpolation may be performed by a number of methods. In one case, the performance figures in the profile are presumed to vary linearly with workload. Presuming a linear variability, the micro tier can calculate the optimum workload to maximize performance for a particular drive.

Alternatively, the interpolation may involve the following steps:
1. Calculating the device's 100% pure random read miss under the average input/output size.
2. Calculating the device's 100% pure random write miss under the average input/output size.
3. Using interpolation to determine a random performance capability by looking at the read/write ratio.
4. Calculating the device's 100% pure sequential read miss under the average input/output size.
5. Calculating the devices 100% pure sequential write miss under the average input/output size.
6. Using interpolation to generate a sequential performance capability by looking at the read/write ratio.
7. Using the same interpolation on steps 3 and 6 to generate a final result by looking at the random/sequential ratio.

In other implementations, the performance of a particular storage device does not vary linearly with workload. In that case, the micro tier system can user other interpolation methods to identify an optimum workload for each storage device in the system. One such interpolation includes the non-linear Harmonic interpolation method, which allows for the estimated convergence point of two varying values. In other implementations, various combinations of these interpolation methods may be utilized.

After the optimum workload thresholds are determined for a particular storage device, in step 406 the workloads of the storage devices of the storage system are adjusted to optimize the overall storage system performance.

In one implementation, the method illustrated in FIG. 4 is first implemented for the storage system's fastest attached storage devices. After the workload is optimized for each of the system's fastest devices (e.g., SSDs) the storage system's next slowest storage devices are optimized and so on. In general, the present method for optimization may be utilized to optimize the workload allocations amongst any combination of storage devices within a storage system. For example, the present system and method may optimize workload allocations in a storage system including homogeneous storage devices, 2 tier pools of storage devices, 3 tier pools of storage devices, and the like, where the storage devices include any types of storage devices configured to store data.

In addition to optimizing the workload for attached storage devices based upon current operating conditions, the micro tier may optimize performance based upon the historical use of the storage system. For example, the micro tier may store workload history data describe the workload for connected storage devices over an extended time period (e.g., for a number of hours, weeks, months or years). By reviewing that historical data and trending anticipated upcoming workloads for the storage system's attached storage devices, it may be possible to optimize the workload of the storage devices in view of historical trends. For example, if workload historical data is maintained over a number of days, the data may indicate that over the weekends the storage system is generally used for backup operations calling for large bandwidth. Based upon that historical usage, the micro tier could, on weekends, optimize the workload of attached storage devices for backup activities (e.g., by shifting workload away from SSD to SATA drives). Conversely, the historical workload data may indicate that during workdays the workload of the storage system is characterized by low-bandwidth, high-performance use. In that case, during workdays, the micro tier may optimize the workload across the storage devices of the storage system to be optimized for low-bandwidth, high-performance use (e.g., by shifting workload to SSDs).

Figure 5:
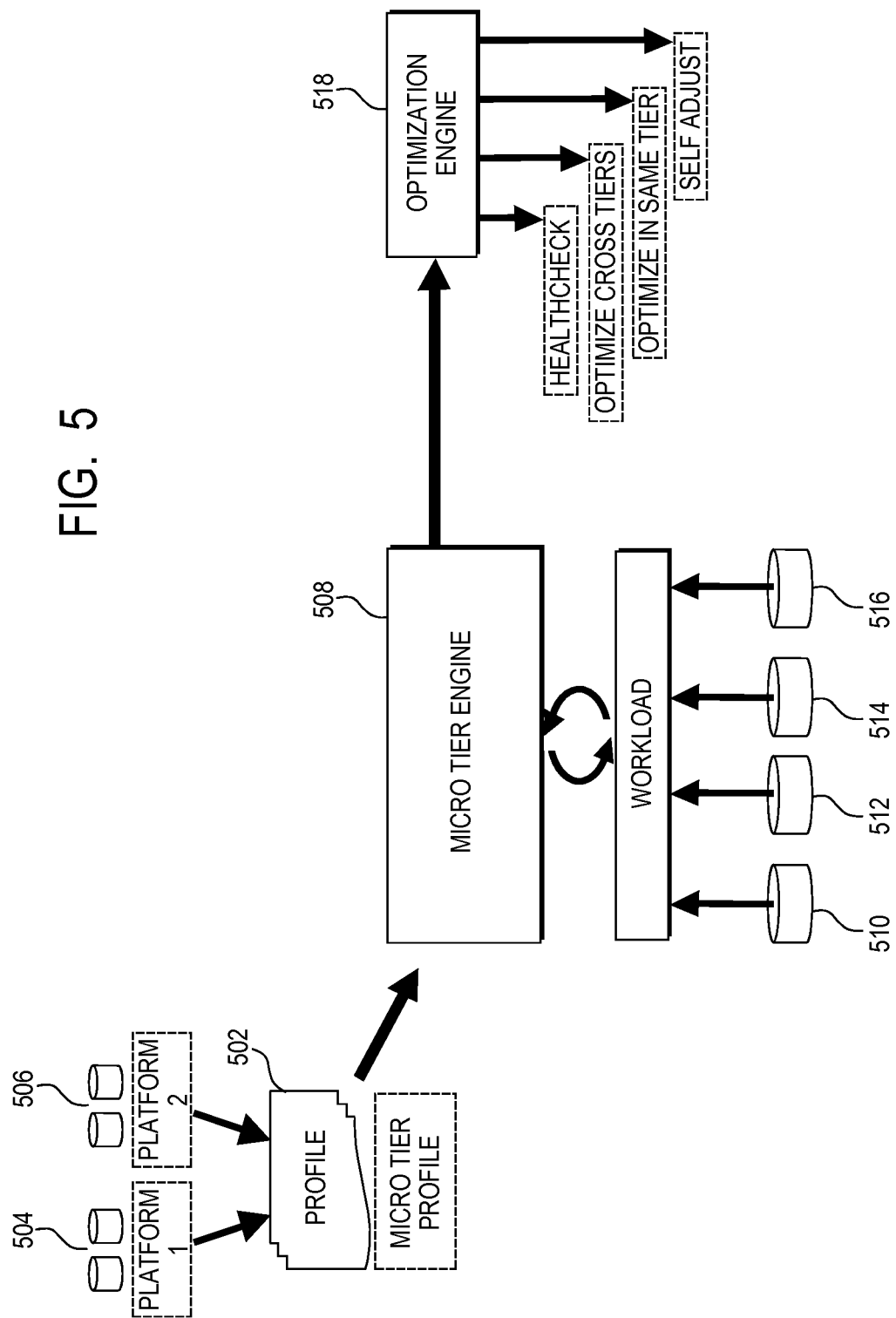
FIG. 5 is a diagram illustrating an example workflow of the present micro tier system.

FIG. 5 is a diagram illustrating an example workflow of the present micro tier system. A profile 502 is first associated with each storage device in a storage system. A particular profile may characterize the performance of the storage device given a number of different platforms 504, 506 or, as discussed, a number of different configurations or operating environments. Profile 502 is then made available to micro tier engine 508.

Micro tier engine 504 monitors a current workload of a number of storage devices 510, 512, 514, 516 that are connected to the storage system.

Micro tier engine 502 communicates the profiles 502 for each connected storage device, as well as the current workload conditions of the connected storage devices to optimization engine 518 (note that in some implementations optimization engine 518 is merged into and is part of micro tier engine 508). Optimization engine 518 analyzes the current workload conditions for the storage devices and interpolates the profile data for the connected storage devices in order to determine an optimized workload for the storage devices. Optimization engine 518 may then undertake a number of actions in order to optimize the workload distribution across storage devices 510, 512, 514, and 516. The actions may involve analyzing the current workload to determine a health level of the storage device. If, for example, a storage device's current performance falls well outside of its expected performance based upon that device's profile, the drive may be considered to be failing.

In addition to the health check, optimization engine 518 may shift workload between storage devices within a single tier, or between devices in different tiers in order to optimize the workload distribution. Finally, optimization engine 518 may perform self-adjustment activities in order to modify the workload allocation algorithms current being implemented by the micro tier system and optimization engine.

In certain embodiments, individual steps recited in FIG. 4 may be combined, eliminated, or reordered.

In certain embodiments, instructions, such as instructions 398 (FIGS. 2, 3) encoded in computer readable medium 396 (FIGS. 2, 3), wherein those instructions are implemented by a processor, such as processor 394 (FIGS. 2, 3), to perform one or more of steps 400, 402, 404, and/or 406, recited in FIG. 4.

In other embodiments, the invention includes instructions residing in any other computer program product, where those instructions are implemented by a computer external to, or internal to, data storage library 100 (FIG. 3), data storage system 200 (FIG. 2), data storage system 300 (FIG. 3), to perform one or more of steps 400, 402, 404, and/or 406, recited in FIG. 4. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to optimize workload across a plurality of storage devices of a storage system, comprising:

prior to placing said storage system in operation, measuring performance characteristics for a first storage device;

comparing said measured performance characteristics of said first storage device with actual first storage device runtime performance determined after said storage controller is put into use; and optimizing a usage of the first storage device within the storage system;

wherein:

said performance characteristics comprise average seek times for read operations, average write times using a standardized file, and throughput and bandwidth thresholds of said first storage device under known workloads;

said data storage system comprises a storage controller and a first plurality of data storage devices and a second plurality of data storage devices;

said storage controller comprises a processor, memory, instructions written to said memory, a plurality of enabled commands written to said memory, and a plurality of enabled command parameters written to said memory;

said first storage device is one of said plurality of data storage devices;

said storage controller is in communication with a plurality of host computers via a plurality of host adapters disposed in said storage controller;

said storage controller is in communication with said first storage device via a device adapter disposed in said storage controller.

2. The method of claim 1, wherein optimizing a usage of the first storage device includes moving workload to a second storage device disposed in said storage system.

3. The method of claim 1, further comprising interpolating a performance threshold for the first storage device using a linear interpolation method.

4. The method of claim 3, wherein interpolating a performance threshold for the first storage device includes using at least one of a linear interpolation method, a Harmonic interpolation method, and a combination of the linear interpolation method and the Harmonic interpolation method.

5. The method of claim 3, further comprising identifying a throughput and a bandwidth of the first storage device at a given workload.

6. The method of claim 1, wherein the first storage device includes at lest one of a solid state drive, a SAS/FC device and a SATA storage device.

7. The method of claim 6, wherein the optimized workload for the first storage device is configured to avoid overloading an available bandwidth or throughput of the first storage device.

8. An article of manufacture comprising an application and a non-transitory computer readable medium comprising computer readable program code disposed therein to perform optimizing workload across a plurality of storage devices, wherein the article of manufacture is in communication with a storage controller, the computer readable program code comprising a series of computer readable program steps to effect:

retrieving a profile for a first storage device, wherein said profile comprises measured performance characteristics determined prior to placing said storage system in operation, wherein said performance characteristics comprise average seek times for read operations, average write times using a standardized file, and throughput and bandwidth thresholds of said first storage device under known workloads;

comparing said profile with actual first storage device runtime performance determined after said storage system is put into use; and optimizing a usage of the first storage device within the storage system;

wherein:

said data storage system comprises a storage controller comprising a processor, memory, instructions et awritten to said memory, a plurality of enabled commands written to said memory, and a plurality of enabled command parameters written to said memory and a first plurality of data storage devices and a second plurality data storage devices;

said first storage device is one of said plurality of data storage devices;

said storage controller is in communication with a plurality of host computers via a plurality of host adapters disposed in said storage controller;

said storage controller is in communication with said first storage device via a device adapter disposed in said storage controller.

9. The article of manufacture of claim 8, wherein optimizing a usage of the first storage device includes moving workload to a second storage device.

10. The article of manufacture of claim 8, the computer readable program code further comprising a series of computer readable program steps to effect interpolating a performance threshold for the first storage device using a linear interpolation method.

11. The article of manufacture of claim 10, wherein said computer readable program code further comprises a series of computer readable program steps to effect interpolating a performance threshold for the first storage device using at least one of a linear interpolation method, a Harmonic interpolation method, and a combination of the linear interpolation method and the Harmonic interpolation method.

12. The article of manufacture of claim 10, further comprising identifying a throughput and a bandwidth of the first storage device at a given workload.

13. The article of manufacture of claim 8, wherein the first storage device comprises a solid state drive, a SAS/FC device and a SATA storage device.

14. The article of manufacture of claim 13, wherein the optimized workload for the first storage device is configured to avoid overloading an available bandwidth or throughput of the first storage device.

15. A computer program product encoded in a non-transitory computer readable medium and useable with a programmable computer processor to optimize workload across a plurality of storage devices of a storage system comprising a storage controller comprising a processor, memory, instructions written to said memory, a plurality of enabled commands written to said memory, and a plurality of enabled command parameters written to said memory and a first plurality of data storage devices and a second plurality data storage devices, comprising:

computer readable program code which causes said programmable computer processor to retrieve a profile for a first storage device, wherein said profile comprises measured performance characteristics determined prior to placing said storage system in operation, wherein said performance characteristics comprise average seek times for read operations, average write times using a standardized file, and throughput and bandwidth thresholds of said first storage device under known workloads;

computer readable program code which causes said programmable computer processor to compare said profile with actual first storage device runtime performance determined after said storage system is put into use; and computer readable program code which causes said programmable computer processor to optimize a usage of the first storage device within the storage system;

wherein:

said performance characteristics comprise average seek times for read operations, average write times using a standardized file, and throughput and bandwidth thresholds of said first storage device under known workloads;

said data storage system comprises a storage controller and a plurality of data storage devices;

said first storage device is one of said plurality of data storage devices;

said storage controller is in communication with a plurality of host computers via a plurality of host adapters disposed in said storage controller;

said storage controller is in communication with said first storage device via a device adapter disposed in said storage controller.

16. The computer program product of claim 15, wherein said computer readable program code which causes said programmable computer processor to optimize a usage of the first storage device further comprises computer readable program code to move workload to a second storage device.

17. The computer program product of claim 15, further comprising computer readable program code which causes said programmable computer processor to identify a performance threshold for the first storage device includes computer readable program code to use a linear interpolation method.

* * * * *